United States Patent
Faye et al.

(10) Patent No.: US 6,994,276 B2
(45) Date of Patent: Feb. 7, 2006

(54) DEVICE FOR MIXING FLUIDS

(75) Inventors: Ian Faye, Stuttgart (DE); Thanh-Hung Nguyen-Schaefer, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 10/381,384

(22) PCT Filed: Jul. 24, 2002

(86) PCT No.: PCT/DE02/02723

§ 371 (c)(1),
(2), (4) Date: Aug. 4, 2003

(87) PCT Pub. No.: WO03/013712

PCT Pub. Date: Feb. 20, 2003

(65) Prior Publication Data

US 2004/0056112 A1    Mar. 25, 2004

(30) Foreign Application Priority Data

Aug. 2, 2001  (DE) ............................... 101 38 006

(51) Int. Cl.
*F23D 11/10*  (2006.01)

(52) U.S. Cl. .................. 239/421; 239/423; 239/434.5; 239/135

(58) Field of Classification Search ............. 239/533.2, 239/418, 421, 423, 434.5, 135, 138

See application file for complete search history.

(56) References Cited

U.S. PATENT DOCUMENTS

| | | | |
|---|---|---|---|
| 2,101,922 A | * | 12/1937 | Stoesling .................... 427/314 |
| 2,905,234 A | * | 9/1959 | Scholz ........................ 239/132 |
| 3,194,191 A | * | 7/1965 | Hawk, Sr. ..................... 228/57 |
| 4,472,134 A | | 9/1984 | Ettman |
| 4,919,853 A | * | 4/1990 | Alvarez et al. ............... 264/12 |
| 5,060,867 A | | 10/1991 | Luxton et al. |

FOREIGN PATENT DOCUMENTS

| | | |
|---|---|---|
| DE | 23 56 769 A | 6/1975 |
| DE | 31 06 911 A1 | 9/1982 |
| DE | 199 53 914 A1 | 5/2000 |
| GB | 848 203 A | 9/1960 |
| GB | 2 149 082 A | 6/1985 |

* cited by examiner

*Primary Examiner*—Dinh Q. Nguyen
(74) *Attorney, Agent, or Firm*—Michael J. Striker

(57) ABSTRACT

A device for mixing fluids, in particular a gas injection valve, nozzle valve, mixing nozzle or jet compressor, is proposed. To that end, a first fluid-carrying device (12) for carrying a first fluid and a second fluid-carrying device (13) for carrying a second fluid are provided; the fluids are mixed with one another in a mixing region (16) that is in communication with the fluid-carrying devices (12, 13). In addition, a means (20) for generating turbulence in the applicable fluid and a heater, with which the fluid can be heated before reaching the mixing region (16), disposed downstream of the means (20) for generating turbulence in terms of the flow direction of the applicable fluid are associated with at least one of the fluid-carrying devices (12, 13). The proposed device is used in particular for mixing hydrogen and saturated steam and to deliver this mixture to a fuel cell.

12 Claims, 2 Drawing Sheets

DEVICE FOR MIXING FLUIDS

BACKGROUND OF THE INVENTION

The invention relates to a device for mixing fluids, in particular a gas injection valve, mixing nozzle or jet compression nozzle, for instance for use to deliver fuel to a fuel cell, as generically defined by the preamble to the main claim.

In the operation of fuel cells, it is known to supply them with a mixture of hydrogen and saturated steam; the mixture quantity of hydrogen and saturated steam, and its composition, are metered in or adjusted via a nozzle valve.

Often, the problem arises that the steam delivered condenses inside the nozzle or inside the nozzle valve, causing it to freeze and thus become plugged, or causing failure in the function of the nozzle and the downstream fuel cell, or a marked reduction in the efficiency of the nozzle.

The object of the present invention was to furnish a device for mixing fluids, in particular for mixing hydrogen and in particular saturated steam, that can also be used to deliver fuel to a fuel cell, in which failure from icing or condensation does not occur.

SUMMARY OF THE INVENTION

The device for mixing fluids of the invention has the advantage that a reduction in the efficiency, a failure in operation from condensation, stopping up or icing, for instance, is effectively suppressed, so that overall, operating safety and reliability are improved considerably compared to the prior art. Especially in the case of the device of the invention, it is assured that icing from condensation of water does not occur in its outlet region.

For instance, it is especially advantageous if the means for generating turbulence has a body, in particular a rod or an arrangement of rods, a ring or an arrangement of rings, a small plate, a perforated screen, a shower head, or a sieve, that is exposed to or introduced into the flow of the fluid, which in particular is disposed as immediately as possible upstream of the heater in such a way that as a result of the turbulence generated by way of it, an especially effective heat transfer from the heater into the fluid bathing the heater is achieved. Moreover in this way, the fluid delivered to the device of the invention is also heated more uniformly. It is especially advantageous in this respect if the heater is disposed directly downstream of the means for generating turbulence, and in particular is spaced apart parallel from it. Moreover, especially simple heating of the fluid is attained by using an electric heater, for instance with a heating wire, a heating ring, or a corresponding arrangement of wires or rings.

An especially effective arrangement of the first fluid-carrying device and second fluid-carrying device is obtained by providing that the first fluid-carrying device is formed at least in some regions by an in particular cylindrically symmetrical recess in a preferably metal base body, which recess discharges into a central conduit made in the base body; the central conduit also widens, preferably in funnel-like fashion, in the direction of the outlet of the fluid mixing device. The second fluid-carrying device is then preferably inserted symmetrically into this recess in the base body, so that the second fluid carried in it also discharges into the central conduit.

It has been found to be especially advantageous if the first fluid-carrying device and/or the second fluid-carrying device, in particular both, has at least approximately the shape of a nozzle or preferably a funnel or a cartridge.

In particular, the first fluid-carrying device and the second fluid-carrying device are preferably embodied and disposed such that the second fluid-carrying device sprays the second fluid carried in it into the central conduit in the mixing region and thereby mixes it at this point with the first fluid carried in the first fluid-carrying device. Thus the first fluid and the second fluid do not meet for mixing until in a mixing region in the region of the central conduit.

It is also advantageous if at least one of the fluid-carrying devices is provided superficially, in at least some regions, with a coating, in particular a Teflon coating, which counteracts adhesion, precipitation, or condensation of the applicable fluid carried in the fluid-carrying device, or of a fluid in contact with it on the outside of the fluid-carrying device.

It is especially advantageous if the second fluid-carrying device, inserted into the recess in the base body, is provided on its outside, at least in some regions, particularly in an area surrounding the mixing region or the orifice of the first fluid-carrying device and the second fluid-carrying device into the central conduit, is provided with the aforementioned coating. In this way, precisely in the critical mixing region, a condensation of steam and in particular icing from a temperature drop upon injection is counteracted in a targeted way.

BRIEF DESCRIPTION OF THE DRAWINGS

The invention will be described in further detail in conjunction with the drawings and in the ensuing description.

FIG. 4a shows an alternative embodiment of the heater of FIG. 3a; and

DETAILED DESCRIPTION OF THE PREFERRED EMBODIMENTS

Figure 1:
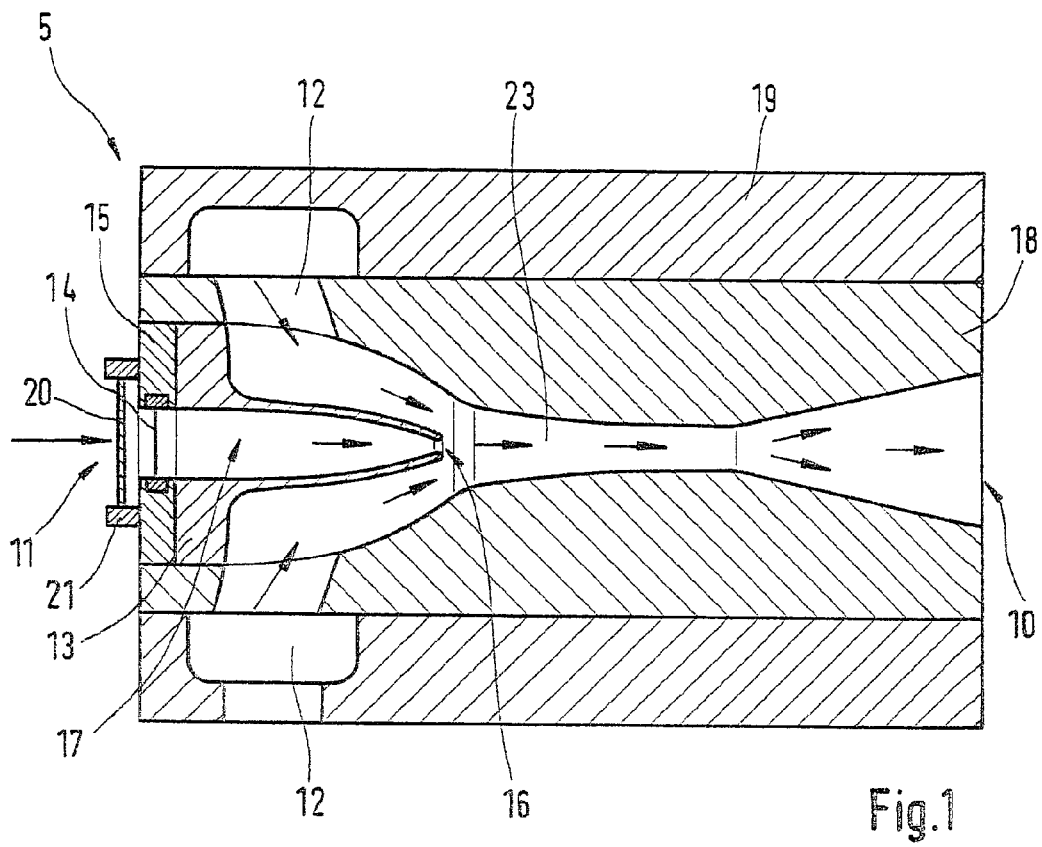
FIG. 1 shows a section through one exemplary embodiment of a fluid mixing device.

FIG. 1 shows a fluid mixing device 5, which is embodied as a gas injection valve or mixing nozzle. In particular, the fluid mixing device 5 is a jet compression nozzle, in which a strong propelling flow through the nozzle drags another, weaker flow along with it. For instance, in the fluid mixing device 5 described, hydrogen and saturated steam are mixed with one another in a mixing tube or mixing region inside the mixing device 5.

For that purpose, the fluid mixing device 5 has a base body 18, which is surrounded by a sleeve 19 with an annular conduit, by way of which a first fluid, such as hydrogen or a gas containing hydrogen, can be delivered to the base body 18. Also provided in the base body 18 is a funnel-shaped recess, which discharges into a central conduit 23 that leads to an outlet 15 of the fluid mixing device 5 that widens in funnel-like fashion. The sleeve 19 or base body 18 of FIG. 1 is preferably embodied cylindrically symmetrically.

FIG. 1 also shows how in the region of the inlet 11 to the fluid mixing device 5, a second fluid-carrying device 13, in this example embodied as a cartridge, is inserted into the funnel-shaped recess created; in its interior, this fluid-carrying device carries a second fluid, such as saturated steam, or a mixture of saturated steam and a gas.

By inserting the second fluid-carrying device 13 into the funnel-shaped recess in the base body 18, a first fluid-carrying device 12 is also created, into which the first fluid is carried, initially separately from the second fluid, via the annular conduit.

Mixing of the first fluid, carried in the first fluid-carrying device 12, and the second fluid, carried in the second fluid-carrying device 13, thus occurs first in a mixing region 16, into which both fluid-carrying devices 12, 13 discharge.

After that, from the mixing region 16, the resultant mixture of fluids is carried via the central conduit 23 to the outlet 10 of the fluid mixing device 5.

At this point it should be emphasized that the second fluid-carrying device 13 may alternatively also be embodied in the form of a funnel or nozzle. However, the second fluid is always carried in a second fluid-carrying region 17 in the interior of the second fluid-carrying device 13.

In FIG. 1 it is also shown that in the region of the inlet 11 of the fluid mixing device 5, the second fluid-carrying device 13 is preceded by a heater, which has a first support body 15 that is embodied in the form of a retaining ring. The heater also has an electrically heated heating wire 14, which with conventional connection contacts 22 with components not shown is electrically heated in a known manner in operation of the fluid mixing device 5.

Finally, the heater is preceded by a means for generating turbulence in the second fluid; this means is formed concretely by a second support body 21, in the form of a support ring, and a turbulence generator 20 that is connected to this support ring or second support body 21.

The turbulence generator 20 is for instance a rod, in particular a round rod, a perforated screen, a sieve, a shower head, or an arrangement or combination of these elements.

The turbulence generator 20 has the task of generating a turbulence in the second fluid, originating at the inlet 11 and delivered to the fluid mixing device 5, so that via the downstream heater, or by means of the heated heating wire 14, an especially effective and uniform heating of the second fluid takes place, before the second fluid then, via the second fluid-carrying device 13, enters the mixing region 16, where it is mixed with the first fluid.

Figure 2:
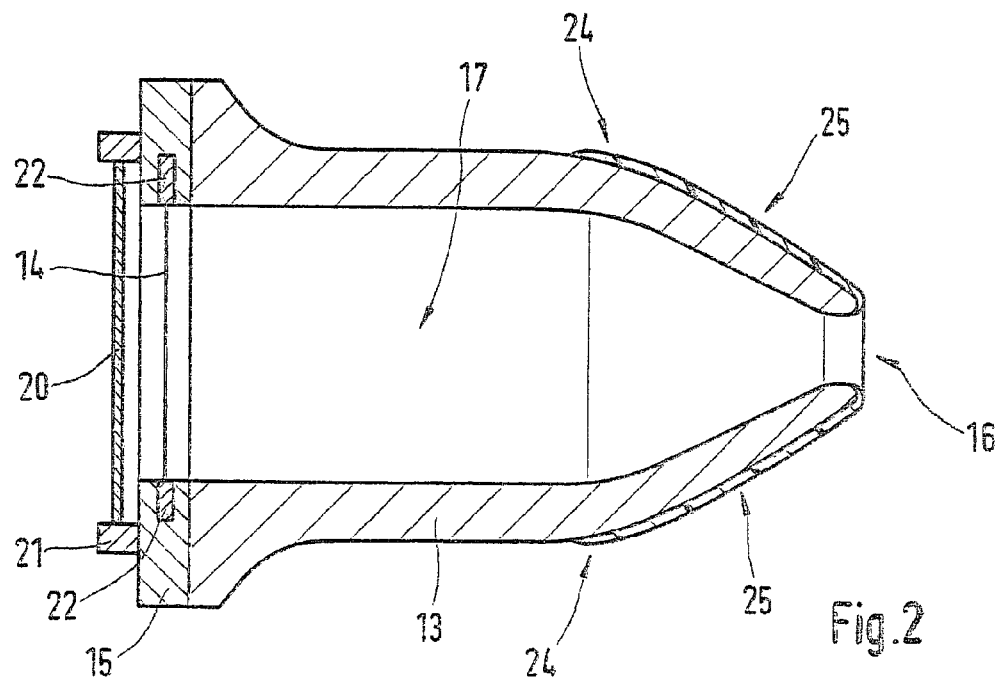
FIG. 2 shows a detail of FIG. 1.

FIG. 2 shows the second fluid-carrying device 13 along with the heater and the means for generating turbulence of FIG. 1, on a larger scale. It can be seen in particular from this that the second fluid-carrying device 13, on its outside 24 that is in contact with the first fluid carried in the first fluid-carrying device 12, is provided with a coating 25.

This coating 25 is provided above all in the orifice region of the second fluid-carrying device 13, that is, the region located in an area surrounding the mixing region 16.

By way of example, the coating 25 is a Teflon coating, and it serves to prevent adhesion and in particular precipitation or condensation of a fluid on the outside 24 of the second fluid-carrying device 13.

Figure 3A:
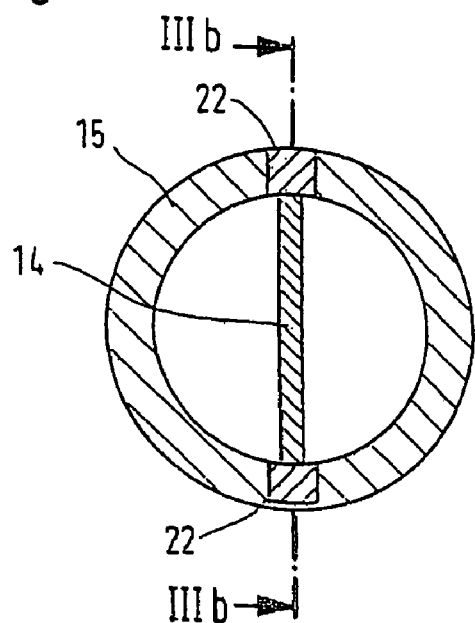
FIG. 3a is a plan view on the heater of FIG. 1 or FIG. 2.
Figure 3B:
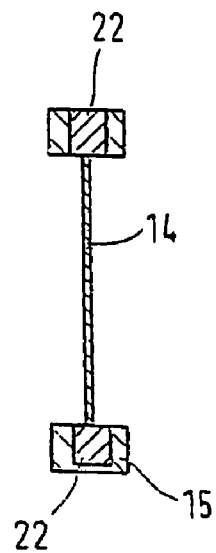
FIG. 3b is a section through the heater of FIG. 3a taken along the section line shown.

FIG. 3a shows a plan view on the heater of FIGS. 1 and 2; it can be seen that the heater is formed by the retaining ring 15 and the heating wire 14, which extends along a diameter of the retaining ring 15. FIG. 3b more clearly shows the connection contacts 22 for electrically heating the first heating wire 14.

Figure 4A:
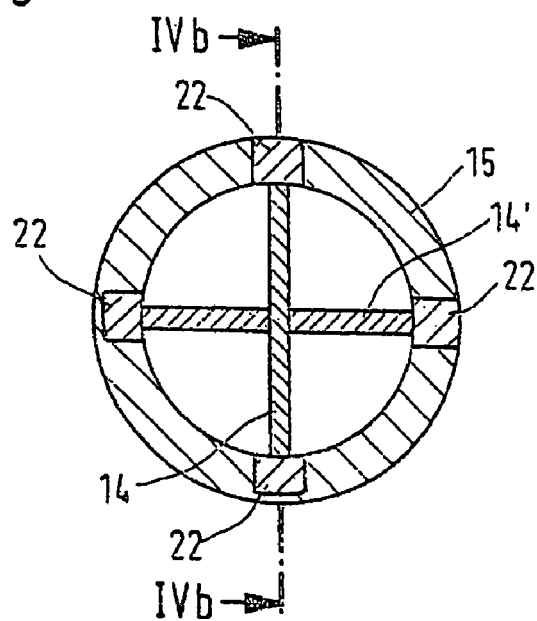
Figure 4B:
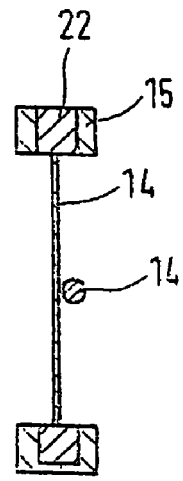
FIG. 4b is a section through the heater of FIG. 4a, taken along the section line shown.

FIG. 4a explains an embodiment of the heater that is an alternative to FIG. 3a; here two heating wires 14, 14' extending perpendicular to one another are provided, which are each heated electrically via corresponding connection contacts 22. FIG. 4b then shows that the first heating wire 14 and the second heating wire 14' are disposed spaced apart from and in line with one another.

It should also be pointed out that the second support body 21 or support ring, except for the connection contacts 22, is embodied of an insulating material. It is furthermore preferably provided in the exemplary embodiment of FIGS. 4a and 4b that in the region where the first heating wire 14 and the second heating wire 14' intersect, they are insulated from one another. This insulation may for instance be an insulating plate disposed between the heating wires 14, 14' in the region of intersection, or an insulating sheathing, provided in this region, of one of the heating wires 14, 14'.

The flow of the two fluids in the fluid mixing device 5 is accelerated sharply in the above-described exemplary embodiments, above all in the mixing region 16, so that a flow velocity occurs there that is typically close to the speed of sound. In an area surrounding the mixing region 16, a decrease in the pressure and the temperature of the fluids is also associated with the increase in flow velocity, so that the lowered temperature at the outlet 10 of the fluid mixing device 5 is many times below the saturation temperature of steam corresponding to the pressure at the outlet 10. In this respect, whenever the temperature of the fluid mixture at the outlet 10 is below the temperature at which steam condenses at the pressure prevailing there, freezing of the fluid mixing device 5 can occur; the heater counteracts this by preventively, or before mixing, heating the second fluid—that is, the saturated steam delivered for instance as the second fluid—to a higher temperature.

Concretely, in the case of the examples described, a temperature that is reduced by approximately 45° C. compared to the temperature prevailing at the inlet 11 occurs in the region of the outlet 10 of the fluid mixing device 5, in operation without the heater. Heating the second fluid with the heater is then regulated in such a way that at the outlet 10, the fluid mixture is always at a temperature at which saturated steam does not condense, or the steam is superheated there.

Overall, by means of the fluid mixing device 5 described, it is attained that the temperature of the fluid mixture emerging in the region of the outlet 10 is higher than the saturation temperature of steam, so that water condensation cannot occur there. Thus with this fluid mixing device 5, a downstream fuel cell, whose chemical reaction with steam requires moistened hydrogen, can be operated reliably and without interruptions.

What is claimed is:

1. A device for mixing steam and hydrogen in fuel cell device in the form of a gas injection valve, mixing nozzle or jet compression nozzle, having a first fluid-carrying device (12) for carrying a first fluid in the form of hydrogen and a second fluid-carrying device (13) for carrying a second fluid in the form of steam, wherein the steam and hydrogen are mixed with one another in a mixing region (16) that is in communication with the fluid-carrying devices (12, 13), and wherein a means (20) for generating turbulence in the applicable fluid and a heater, with which the fluid is heatable before reaching the mixing region (16), downstream of the means (20) for generating turbulence in terms of the flow direction of the applicable fluid are associated with at least one of the fluid-carrying devices (12, 13).

2. The device of claim 1, wherein the means (20) for generating turbulence has a body that is exposed to or introduced into the flow of the fluid, wherein the body is selected from the group consisting of a rod (20) or an arrangement of rods, a ring or an arrangement of rings, a small plate, a perforated screen, a shower head, or a sieve.

3. The device of claim 1, wherein the means (20) for generating turbulence is embodied and/or disposed such that the most effective-possible heating of the fluid subsequently exposed to the heater takes place.

4. The device of claim 1, wherein the heater is an electric heater, and it has a heating wire (14, 14') or heating ring, or an arrangement of heating wires (14, 14') or heating rings.

5. The device of claim 1, wherein the first fluid-carrying device (12) is formed at least in some regions by an cylindrically symmetrical recess in a base body (18), which recess discharges into a central conduit (23) made in the base body (18).

6. The device of claim 5, wherein the central conduit (20) leads to an outlet (10) from the fluid mixing device (5) and widens in funnel-like fashion in an area surrounding of the outlet (10).

7. The device of claim 5, wherein the second fluid-carrying device (13) is inserted symmetrically into the recess in the base body (18) and discharges into the central conduit (23) made in the base body (18).

8. The device of claim 1, wherein the first fluid-carrying device (12) and/or the second fluid-carrying device (13) has at least approximately the shape of a funnel, a cartridge, or a nozzle.

9. The device of claim 1, wherein the second fluid-carrying device (13) sprays the second fluid carried in it into the central conduit (23) in the mixing region (16) and thereby mixes it with the first fluid carried in the first fluid-carrying device (12).

10. A device for mixing steam and hydrogen in fuel cell device in the form of a gas injection valve, mixing nozzle or jet compression nozzle, having a first fluid-carrying device (12) for carrying a first fluid and a second fluid-carrying device (13) for carrying a second fluid, wherein the fluids are mixed with one another in a mixing region (16) that is in communication with the fluid-carrying devices (12, 13), and wherein a means (20) for generating turbulence in the applicable fluid and a heater, with which the fluid is heatable before reaching the mixing region (16), downstream of the means (20) for generating turbulence in terms of the flow direction of the applicable fluid are associated with at least one of the fluid-carrying devices (12, 13), wherein the heater is disposed directly downstream of the means (20) for generating turbulence, and is spaced apart parallel from it.

11. A device for mixing steam and hydrogen in fuel cell device in the form of a gas injection valve, mixing nozzle or let compression nozzle, having a first fluid-carrying device (12) for carrying a first fluid and a second fluid-carrying device (13) for carrying a second fluid, wherein the fluids are mixed with one another in a mixing region (16) that is in communication with the fluid-carrying devices (12, 13), and wherein a means (20) for generating turbulence in the applicable fluid and a heater, with which the fluid is heatable before reaching the mixing region (16), downstream of the means (20) for generating turbulence in terms of the flow direction of the applicable fluid are associated with at least one of the fluid-carrying devices (12, 13), wherein at least one of the fluid-carrying devices (12, 13) is provided in at least some regions superficially with a coating (25) of Teflon, which counteracts an adhesion, precipitation, or condensation of the applicable fluid or ingredients contained therein.

12. The device of claim 11, wherein the second fluid-carrying device (13), which is inserted into the recess of the base body (18) and is contact on its outside (24) with the first fluid, is provided with the coating (25) on this outside (24), at least in some regions and in an area surrounding the mixing region (16).

* * * * *